UNITED STATES PATENT OFFICE.

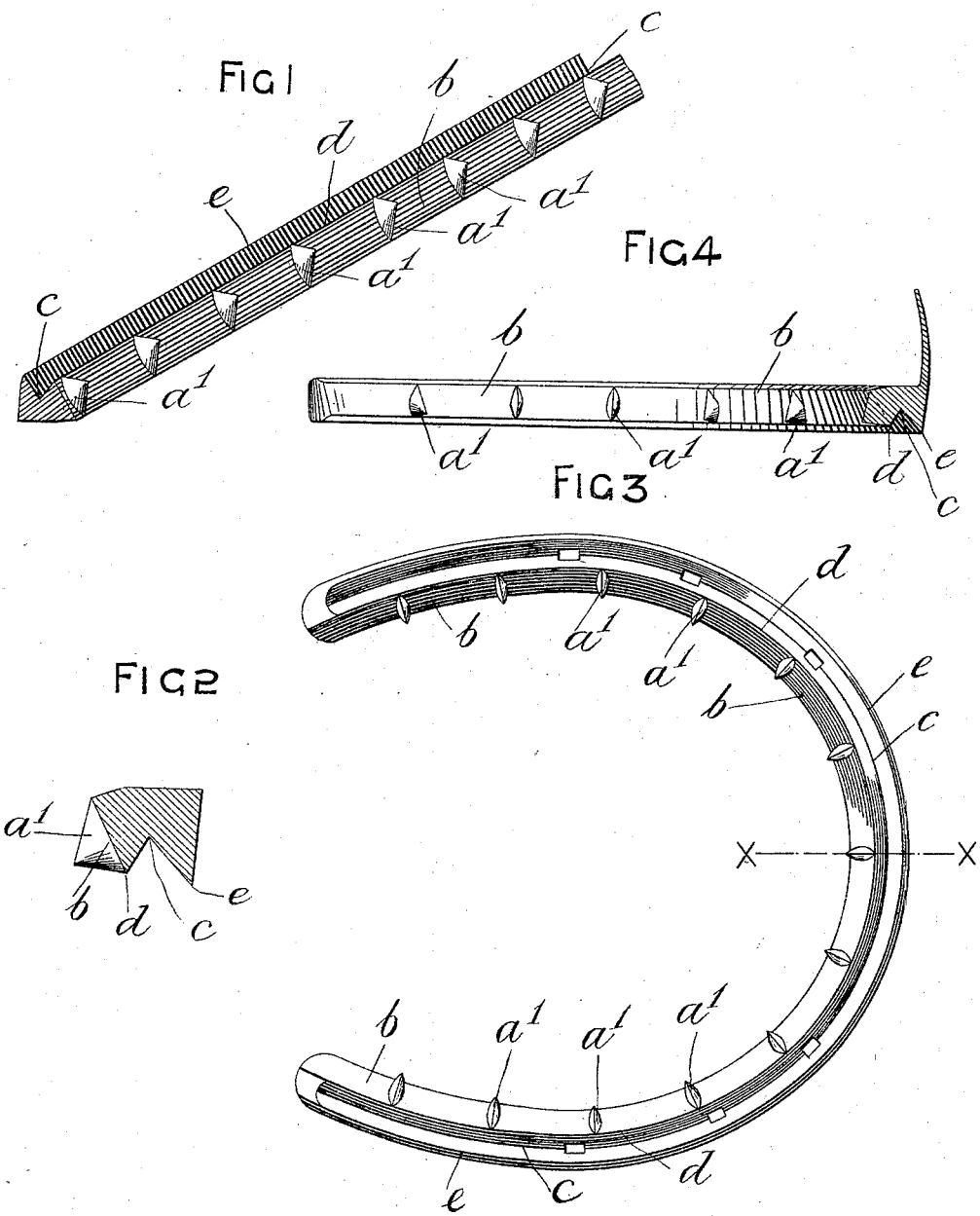

JOSEPH BENFIELD, OF WALSALL, ENGLAND.

HORSESHOE-BAR.

SPECIFICATION forming part of Letters Patent No. 541,956, dated July 2, 1895.

Application filed November 13, 1894. Serial No. 528,674. (No model.)

*To all whom it may concern:*

Be it known that I, JOSEPH BENFIELD, a subject of Her Majesty the Queen of Great Britain and Ireland, residing at Walsall, in the county of Stafford, England, have invented a certain new and useful Improved Horseshoe-Bar, of which the following is a specification.

This invention consists of the herein described improved horseshoe bar for making shoes of the kind herein referred to which are more particularly adapted for race horses and hunters and other horses and draft animals which have to travel over turf or soft ground.

I will describe my invention by referring to the accompanying drawings, on which—

Figure 1 is a projected view of a portion of my improved rolled metal horseshoe-bar. Fig. 2 is an enlarged cross-sectional view of the said bar. Fig. 3 is an inverted plan of a horseshoe formed from the bar shown by Fig. 1, and Fig. 4 is a sectional side elevation of the said shoe on line X X of Fig. 3.

My improved rolled iron or steel horse shoe bar has a beveled side $b$ corresponding to what is called the inner concave side of the shoe and this beveled side has small pointed spikes or teeth $a'$ at short intervals apart formed upon it during the process of rolling by rolls in which there are small depressions corresponding with the spikes or teeth $a'$ as will readily be understood, but these rolls form no part of this invention. In the finished shoe these pointed spikes or teeth $a'$ are on the inner beveled or concave side $b$ of the shoe and are for the purpose of striking into the turf or soft ground to prevent the horse from slipping.

My said improved horse shoe bar has also a V groove $c$ running along one side to form the nail crease. The inclined sides of this groove $c$ respectively terminate in two sharp ribs marked $d$ and $e$, the outer rib $e$ being by preference rather deeper than the other rib $d$ so that when the bar is formed into the finished shoe shown by Figs. 3 and 4 this outer rib $e$ will as shown in Fig. 4 take the first bearing on the ground and then when this is worn down the inner rib $d$ will come more prominently into use.

Having now described my invention, what I claim as new, and desire to secure by Letters Patent, is—

The herein described improved rolled metal horse shoe bar made with nail crease $c$ and with the beveled side $b$ having short spikes or teeth $a'$ rolled upon it, substantially as and for the purpose set forth.

In testimony whereof I have hereunto set my hand in presence of two witnesses.

JOSEPH BENFIELD.

Witnesses:
HERBERT WHITEHOUSE,
RICHARD ARTHUR BENOY.